US009353007B2

(12) United States Patent
Eberwein et al.

(10) Patent No.: US 9,353,007 B2
(45) Date of Patent: May 31, 2016

(54) DRY MORTAR MIXTURE

(75) Inventors: Michael Eberwein, Emmerting (DE); Christian Trieflinger, Burgkirchen (DE); Michael Schinabeck, Altemarkt (DE); Jutta Karin Langlotz, Trostberg (DE); Stefan Friedrich, Garching (DE); Gregor Herth, Trostberg (DE)

(73) Assignee: BASF CONSTRUCTION POLYMERS GmbH, Trostberg (DE)

( * ) Notice: Subject to any disclaimer, the term of this patent is extended or adjusted under 35 U.S.C. 154(b) by 876 days.

(21) Appl. No.: 13/509,100

(22) PCT Filed: Oct. 28, 2010

(86) PCT No.: PCT/EP2010/066393
§ 371 (c)(1),
(2), (4) Date: Dec. 31, 2012

(87) PCT Pub. No.: WO2011/057898
PCT Pub. Date: May 19, 2011

(65) Prior Publication Data
US 2013/0098271 A1    Apr. 25, 2013

(30) Foreign Application Priority Data

Nov. 11, 2009  (EP) ..................................... 09175656

(51) Int. Cl.
| | | |
|---|---|---|
| *C04B 28/04* | (2006.01) | |
| *C04B 28/06* | (2006.01) | |
| *C04B 24/12* | (2006.01) | |
| *C04B 24/16* | (2006.01) | |
| *C04B 28/02* | (2006.01) | |
| *C04B 111/00* | (2006.01) | |
| *C04B 111/72* | (2006.01) | |

(52) U.S. Cl.
CPC ................. *C04B 28/04* (2013.01); *C04B 28/02* (2013.01); *C04B 28/06* (2013.01); *C04B 2111/00543* (2013.01); *C04B 2111/00646* (2013.01); *C04B 2111/00672* (2013.01); *C04B 2111/72* (2013.01); *Y02W 30/92* (2015.05); *Y02W 30/94* (2015.05)

(58) Field of Classification Search
CPC ........ C04B 28/04; C04B 28/06; C04B 24/12; C04B 24/124; C04B 24/16; C04B 24/161
See application file for complete search history.

(56) References Cited

U.S. PATENT DOCUMENTS

| | | | |
|---|---|---|---|
| 2,259,782 A * | 10/1941 | Snell ............................. | 106/666 |
| 2,556,156 A * | 6/1951 | Avery ......................... | 106/18.25 |
| 3,686,133 A | 8/1972 | Hattori et al. | |
| 3,782,991 A * | 1/1974 | Burge ........................... | 106/666 |
| 4,430,469 A | 2/1984 | Burge et al. | |
| 4,501,839 A | 2/1985 | Burge et al. | |
| 4,725,665 A | 2/1988 | Pieh et al. | |
| 4,857,610 A | 8/1989 | Chmelir et al. | |
| 5,750,634 A | 5/1998 | Albrecht et al. | |
| 5,989,336 A * | 11/1999 | Carpenter et al. ............ | 106/811 |
| 6,555,683 B1 | 4/2003 | Weichmann et al. | |
| 7,070,648 B1 * | 7/2006 | Schwartz et al. ............ | 106/772 |
| 7,360,598 B1 * | 4/2008 | Lewis et al. .................. | 166/293 |
| 7,851,521 B2 | 12/2010 | Bacher et al. | |
| 7,972,424 B2 | 7/2011 | Bastelberger et al. | |
| 8,148,304 B2 | 4/2012 | Spindler et al. | |
| 2003/0144386 A1 | 7/2003 | Pakusch et al. | |
| 2010/0190888 A1 | 7/2010 | Gaeberlein et al. | |
| 2010/0234490 A1 | 9/2010 | Gaeberlein et al. | |
| 2011/0000399 A1* | 1/2011 | Hauk ............................ | 106/661 |

FOREIGN PATENT DOCUMENTS

| | | |
|---|---|---|
| DE | 2007 603 A1 | 2/1971 |
| DE | 44 11 791 A1 | 10/1995 |
| DE | 196 09 614 A1 | 9/1996 |
| DE | 195 38 821 A1 | 10/1996 |
| DE | 102 02 039 A1 | 7/2003 |
| DE | 103 23 205 A1 | 12/2004 |
| DE | 10 2004 020 121 A1 | 1/2006 |
| DE | 10 2005 037 777 A1 | 2/2007 |
| DE | 10 2006 028 663 A1 | 1/2008 |
| DE | 10 2006 027 470 A1 | 12/2008 |
| EP | 0 059 353 A1 | 9/1982 |
| EP | 0 214 412 A1 | 3/1987 |
| WO | WO 2006/061139 A1 | 6/2006 |
| WO | WO 2006/133933 A2 | 12/2006 |
| WO | WO 2008/151879 A1 | 12/2008 |
| WO | WO 2009/074447 A1 | 6/2009 |

OTHER PUBLICATIONS

Bayer, et al. Dry Mortars, Ullmann's Encyclopedia of Industrial Chemistry, 6$^{th}$ Ed., vol. 11 Wiley-VCH Verlag GmbH & Co. KGaA, Weinheim, (2003), pp. 83-108.

* cited by examiner

*Primary Examiner* — Paul Marcantoni
(74) *Attorney, Agent, or Firm* — Oblon, McClelland, Maier & Neustadt, L.L.P.

(57) ABSTRACT

A dry mortar mixture based on at least one hydraulic and/or latently hydraulic binder which in the made-up and not yet cured state has firm properties is claimed. The novel dry mortar mixture is characterized in that it contains at least one representative of a dispersant and at least one compound having superabsorbent properties. This mixture makes it possible to carry over the advantages of known tile adhesives for horizontal application to vertical application possibilities.

30 Claims, No Drawings

DRY MORTAR MIXTURE

This application is a §371 of PCT/EP2010/066393 filed on Oct. 28, 2010, and claims priority from European Patent Application 09175656.9 filed Nov. 11, 2009.

The present invention relates to a dry mortar mixture and its use.

"R. Bayer, H. Lutz, Dry Mortars, Ullmann's Encyclopedia of Industrial Chemistry, 6th ed., vol. 11, Wiley-VCH, Weinheim, (2003), 83-108" give an overview of the uses and composition of dry mortars. Dry mortars comprise binders, aggregates and various additives.

Depending on the composition, dry mortars are employed, for example, as grouting mortars, self-levelling underlayments, screeds, flow screeds, tile adhesives, jointing mortars, renders, adhesive and reinforcing mortars for external thermal insulation composite systems (TICS) or repair mortars. Dry mortars can be used for both interior and exterior applications. The latter applications include, for example, the abovementioned adhesive and reinforcing mortars for ETICS, renders and repair mortars. Such dry mortars are, after curing, in direct contact with the environment and are thus exposed directly to the climate. Such systems therefore have to meet more demanding requirements than products for interior applications. Rain and condensed atmospheric moisture, in particular, can severely affect dry mortars in exterior applications and thus have an adverse effect on the life thereof. In this context and to alleviate these adverse effects, a person skilled in the art will make recourse to hydrophobizing agents as additive.

The demands made of modern dry mortar mixtures, especially in the field of tile adhesives and some further fields of application, are very high in respect of their properties both in the fresh state (rheological processing properties such as slipping resistance and water retention) and in the hardened state (abrasion resistance, scratch resistance, tensile strength in bending and adhesion pull-off strengths on various substrates). These properties are, as described in the abovementioned article by "R. Bayer", improved by additives known in the field of dry mixtures, e.g. water retention agents based on polysaccharides (for example cellulose ethers) and redispersible polymer powders.

In flowable dry mortar applications, plasticizers or dispersants are used to improve the flowability of the mortar. They disperse the inorganic binder and the fillers and a very good flowability is therefore achieved even at a low water content. In sag resistant dry mortars such as the adhesives, jointing mortars, renders, adhesive and reinforcing mortars for external thermal insulation composite systems (ETICS), the use of plasticizers has, in contrast, not become established since the necessary sag resistance is no longer achieved.

"Adhesive mortars" are known, for example, from the German published specification DE 10 2004 030 121 A1. To a person skilled in the art, "adhesive mortars" are, inter alia, cement-containing reinforcing mortars, etc., which contain, as main constituents, inorganic binders in the form of cements together with fillers based on silica- and/or carbonate-containing raw materials. The adhesive mortars described in the published specification mentioned comprise a hydraulic binder, additives based on pozzolanic and/or latently hydraulic additives, fillers, a polymeric plasticizer, a redispersible polymer powder and/or a polymer dispersion, a water retention agent and also other additives which are selected from the group consisting of accelerators, retarders, thickeners, colour pigments, reducing agents, air pore formers and processing aids; water is indicated as balance.

DE102004030121 A1 states that the use of the dispersant in tile adhesives which are suitable for floor applications and therefore do not have to meet very demanding requirements in terms of the sag resistance of the mortar enables excellent processing properties such as absorption behaviour, correctability and open time to be achieved. In addition, the physical properties of the hardened mortar are also influenced positively, in particular the fracture behaviour and the adhesion pull-off strengths on concrete substrates. Furthermore, no efflorescence is observed in these adhesive mortars, which is particularly advantageous in exterior applications.

Hydrophobizing agents are described in chapter 3.2.2 of the abovementioned article by R. Bayer. In this chapter, the two principal possibilities for hydrophobization are also mentioned. These are essentially the use of metal salts of fatty acids, e.g. zinc stearate and sodium oleate, and as an alternative or in addition the use of hydrophobically modified redispersible powders, for example the hydrophobized Vinnapas® grades from Wacker Chemie AG.

A hydrophobizing and water-redispersible polymer powder is, for example, known from WO 2006/061139 A1. According to that document, the polymer powder contains a polymer having from 50 to 90 parts by weight of vinyl acetate monomer units, from 5 to 50 parts by weight of vinyl ester monomer units of vinyl esters of α-branched monocarboxylic acids having from 2 to 20 carbon atoms, from 1 to 30 parts by weight of methacrylic ester monomer units of alcohols having from 1 to 15 carbon atoms, up to 40 parts by weight of vinyl ester monomer units of long-chain monocarboxylic acids having from 10 to 20 carbon atoms, up to 20 parts by weight of ethylene units and optionally further auxiliary monomer units.

Oleophobic and hydrophobic copolymers are known from DE 10 2006 028 663 B4. These copolymers can be in the form of an aqueous dispersion or in the form of water-dispersible powders.

A likewise hydrophobizing and water-redispersible additive based on fatty acids is described in DE 103 23 205 A1.

Particularly in the case of metal salts of fatty acids, as described in DE 10 2006 028 663, the addition for the purpose of hydrophobicization leads to poorer wetting and thus also to poorer workability. In addition, the conventional hydrophobizing agents can be washed out, as a result of which the hydrophobizing effect decreases dramatically in the long term. Furthermore, a person skilled in the art will know that highly effective hydrophobizing agents such as pure sodium oleate tend to result in crack formation, especially on exterior walls. For this reason, such hydrophobizing agents are combined as mixtures with metal salt stearates.

In particular, additives such as redispersible polymer powders and/or cellulose ethers are routine in polymer-modified cement-containing dry mixtures, but these additives, in particular the redispersible polymer powders, are very costly because of the sometimes high dosage (up to 6% by weight).

The use of hydrophobically modified redispersible powders has therefore not become widely established in industrial practice because of the increased costs. In addition, important properties which are introduced into the building chemical mixture by the dispersion powder, e.g. strength and adhesion pull-off values, are in this case inevitably coupled with other properties such as hydrophobicity, as a result of which important degrees of freedom are taken away from the formulator. Owing to the sometimes strongly hydrophobizing properties, the dispersion powder has to be introduced in larger amounts compared to a nonhydrophobizing variant in order to ensure the required adhesive bond to the substrate. This applies particularly in the processing of polystyrene-based insulation materials of the EPS and XPS type in respect of the adhesive properties.

The use of superabsorbent polymers in building material mixtures is likewise known. For example, US-A-2003144386 describes the use of superabsorbents in cement-containing building material mixtures to improve the strength development. However, the water absorption capacity or water retention capacity of the superabsorbents disclosed in this document in calcium-containing systems, for example in cement-containing systems, is relatively low.

DE 102 02 039 A1 describes mixtures of solid, finely divided and hydrogel-forming polymers and also hydraulically setting building materials. The polymers have a proportion of not more than 2% by weight of particles having a particle size of more than 200 μm. The polymers preferably contain monoethylenically unsaturated $C_3$-$C_{25}$-carboxylic acids or anhydrides thereof as monomers. A disadvantage of such polymeric superabsorbents is their tendency to collapse in cement-containing systems since they are made up essentially of pure acrylic acid.

Superabsorbent polymers (SAP) are usually powdery copolymers which can swell in water or aqueous salt solutions. SAPs are, in particular, crosslinked high molecular weight, either anionic or cationic polyelectrolytes which can be obtained by free-radical polymerization of suitable ethylenically unsaturated vinyl compounds and subsequent drying of the copolymers obtained in this way. On contact with water or aqueous systems, hydrogels are formed with swelling and absorption of water; an amount of water corresponding to a multiple of the weight of the powdery copolymer can be absorbed. "Hydrogels" are thus water-containing gels based on hydrophilic but crosslinked water-insoluble polymers which are present as three-dimensional networks.

The use of superabsorbents specifically in drying mortars is known. Thus, for example, DE 10 2007 027 470 A1 describes dry mortar mixtures which are based on cement or gypsum plaster as hydraulic binders and contain SAPs. However, it is absolutely necessary for the dry mortar formulations disclosed there to contain a large amount of calcium formate as accelerator for the hydration of cement and the hardening behaviour. For this reason, it is possible to use only particular SAPs which contain a particularly large amount of the relatively expensive monomer 2-acrylamido-2-methylpropane-sulphonic acid (AMPS).

The technologies known from the abovementioned prior art are still capable of improvement in respect of their economics, in particular their productivity. However, the desired dry mixtures should, in particular, have good product properties, especially in the fresh state but also in the hardened state.

Advantageous product properties are desired especially in the case of as yet fresh mortar mixtures which need to have a certain sag resistance, which is particularly important in vertically aligned applications.

Water retention agents in the form of cellulose ethers are frequently added to adhesive mortars in order to optimize the workability. Accessorily, additions of redispersible polymer powders or liquid polymer dispersions in the case of two-component mortar systems give a certain flexibility, as a result of which these "flexmortars" are particularly suitable for application to substrates which are subsequently to be laid with rigid ceramic and/or natural stone plates. Particularly in the context of the latter application on horizontal substrates, particular importance is attached to the bond strength and in particular the wet adhesion pull-off strength. As such, tile adhesives are applied as thin-bed or medium-bed mortars. For this purpose, they need to have good flowability and thus comprise only small proportions, if any, of thickeners.

It is therefore an object of the preset invention to provide novel dry mortar mixtures based on at least one hydraulic and/or latently hydraulic binder which can be produced advantageously from economic points of view and have processing and quality advantages, in particular in vertical applications.

The demands which modern dry mortar mixtures have to meet, especially in the field of tile adhesives and some further applications, in respect of their properties in the as yet fresh state (rheological processing properties such as sag resistance and water retention) and also in the hardened state (abrasion resistance, scratch resistance, tensile strength and pull-off strength on various substrates) are very high. These properties are, as described in "R. Bayer, H. Lutz, Dry Mortars, Ullmann's Encyclopedia of Industrial Chemistry, 6th ed., vol. 11, Wiley-VCH, Weinheim, (2003), 83-108" improved by additives known in the field of dry mixtures, e.g. water retention agents based on polysaccharides (for example cellulose ethers) and redispersible polymer powders. However, the additives mentioned, especially the dispersion powders, are very costly compared to the other dry mixture components. However, the productivity of dry mixtures, which is defined as the ratio of area covered to the mass of dry mortar applied, is capable of improvement for economic reasons but also in terms of further advantages for the user (e.g. less dry mortar has to be kept in stock). It is also necessary to accelerate setting or the development of (early age) strength of the dry mortar. This is achieved in an advantageous way, partly due to its good effectiveness, by the use of calcium formate or other calcium salts. Other known setting accelerators such as alkanolamines would, particularly when used in interior applications, have the disadvantage of an unpleasant odour and could also be problematical in terms of health.

This leads to the technical object of increasing, in particular, the sag resistance of dry mortar by means of suitable measures without having to accept a reduction in quality of the building products and to achieve sufficient hydrophobicization and crack resistance, especially in ETICS applications.

A further aspect of the formulation of the object is to achieve the advantages of tile adhesives or flexmortars whose use is restricted to horizontal surfaces in sag resistant systems in vertical applications without the mortar systems suffering from disadvantages, especially in the hardened state.

This object is achieved by the use of the dry mortar mixture of the invention which contains a superabsorbent, usually powdery copolymer (superabsorbent) which is suitable for increasing the tolerance to increased W/C values. The polymer chemistry of the superabsorbent has, according to the invention, been adapted so that a sufficiently high water absorption capacity in aqueous systems is ensured, for example in the hydraulic or latently hydraulically setting systems of the invention which additionally contain a dispersant.

The dry mortar mixture of the invention based on at least one hydraulic and/or latently hydraulic binder has, in the made up and fresh state, sag resistant properties which are determined in accordance with DIN EN1308 by a Hägermann slump of <18 cm, determined in accordance with DIN EN1015. This dry mortar mixture is characterized in a way that it contains at least one representative of a dispersant (a) in an amount of from 0.01 to 5.0% by weight, based on the total composition of the dry mortar mixture, and at least one compound having superabsorbent properties (b).

It has surprisingly been found that not only can the abovementioned requirements in terms of product properties be achieved or improved, even in vertical applications, but in addition an extremely low water absorption is observed and the usual decrease in the hydrophobic properties also does not occur. In addition, the flexibility of the hardened dry mortar mixtures has been able to be improved and their crack formation has been able to be significantly reduced. A further advantage is that the use of the dispersant in combination with a superabsorbent enables the dosage of thickeners to be reduced and also allows the amount of dispersion powders to be significantly reduced. This is particularly surprising since the use of dispersants in horizontal applications actually runs counter to the sag resistance of such dry mortar systems and the workability are usually impaired. The totality of the surprising effects and advantages described is obviously associated with the combination of dispersants with superabsorbents and surprisingly occurs in sag resistant dry mortar mixtures which have a slump of <18 cm. Dispersant-containing tile adhesives for use in horizontal applications, as are used, in particular, for the laying of tiles or natural stone plates, usually have a slump of >20 cm, with this slump again being determined in accordance with DIN EN1015-3.

To help define terminology, it should be emphasized that dry mortar mixtures are frequently also referred to as dry mixtures or dry mortars in the literature.

DETAILED DESCRIPTION OF THE INVENTION a) The dry mortar mixture according to the present invention can contain a hydrophobizing agent as further component c). This should preferably be present in an amount of from 0.1 to 0.6% by weight, particularly preferably in an amount of from 0.2 to 0.4% by weight and in particular in an amount from 0.2 to 0.3% by weight, in each case based on the total composition of the dry mortar mixture.

Suitable hydrophobizing agents are metal salts of fatty acids in general which are available in large quantities at low cost. They are usually added as formulation constituents in the production of the dry mortar.

The addition of hydrophobizing agents reduces or completely prevents the penetration of water into the hardened dry mortar. The life expectancy is increased since moisture which penetrates leads, in particular as a result of freezing, to damage, for example in the form of spalling. Suitable hydrophobizing agents for the purposes of the present invention are fatty acid derivatives, in particular $C_{1-14}$-alkyl esters and -alkylaryl esters of lauric acid and/or of oleic acid, monoglycol and/or diglycol esters of lauric acid and/or oleic acid, monoesters, diesters and triesters of glycerol with lauric acid and/or oleic acid, metal salts of fatty acids and particularly preferably zinc stearate and/or sodium oleate, which can also be added as a mixture. Further possibilities are the hydrophobically modified redispersible powders which are well known from the prior art. These can, for example, be based on vinyl acetate monomer units, vinyl ester monomer units and/or methacrylic ester monomer units. Preferred methacrylic ester monomer units are acrylic esters of unbranched or branched alcohols having from 1 to 15 carbon atoms, particularly preferably acrylic esters of unbranched or branched alcohols having from 1 to 8 carbon atoms. Particularly suitable esters are methyl acrylate, n-ethyl acrylate, t-butyl acrylate and 2-ethylhexyl acrylate. Preferred vinyl ester monomer units are long-chain unbranched monocarboxylic acids having from 10 to 20 carbon atoms, in particular those derived from vinyl laurate. Finally, vinyl esters of α-branched monocarboxylic acids having from 2 to 20 carbon atoms are preferred according to the invention. Particular mention may be made at this point of vinyl pivalate and vinyl esters of α-branched monocarboxylic acids having from 9 to 15 carbon atoms (Versatic acid).

b) The cement-containing hydraulic binder is not subject to any particular restrictions in terms of the type of cement. It is possible to use portland cements, in particular those selected from the group CEM I, II, III, IV and V, and/or high-alumina cement (aluminous cement). White cement is suitable particularly in cases in which appropriate colouring of the products plays a role. The cements mentioned can be used individually or as mixtures. The proportion by weight of the cement-containing hydraulic binder in the dry mortar mixture is, depending on the application, from 3 to 50% by weight, preferably a proportion by weight of from 5 to 40% by weight, particularly preferably from 10 to 30% by weight. In addition, $Ca(OH)_2$ (hydrated lime) which sets by means of the carbon dioxide present in the surrounding air is often added as additional nonhydraulic binder. The proportion by weight of hydrated lime is, depending on the application, from 1 to 15% by weight, preferably a proportion by weight of from 2 to 10% by weight. In a further embodiment, pozzolanic and/or latently hydraulic binders can be present as an alternative to or in addition to the abovementioned cements in the dry mortar mixture. In the case of the pozzolanic and/or latently hydraulic additives, preference is given to using fly ash, microsilica, metakaolin, trass flour, aluminosilicate, tuff, phonolite, diatomaceous earth, amorphous precipitated silica, oil shale and also blast furnace slag consisting mainly of noncrystalline material. They are preferably present in the dry mortar mixture in a proportion of from 5 to 50% by weight, based on the total composition of the dry mortar mixture.

c) As further components, the dry mortar mixture of the invention can contain aggregates, preferably aggregates having an average particle size up to 5 mm, preferably in the range from 0.5 to 3 mm and particularly preferably from 1.0 to 2.0 mm. The proportion of these should, according to the present invention, preferably be in the range from 5 to 85% by weight, based on the total composition of the dry mortar mixture.

The abovementioned aggregates or fillers in the dry mortar mixture of the invention have only a low solubility or ability to swell in the aqueous systems. In particular, they do not act as binder.

Aggregates suitable as inorganic fillers are, for example, silica sand, ground limestone, chalk, marble, clay, marl, aluminium oxide, talc and/or barite, with preference being given to siliceous sands, siliceous flours, carbonates in the form of ground limestone, crushed limestone sands, chalk, dolomite, magnesite and mixtures thereof. The inorganic fillers can preferably also be present as lightweight fillers such as hollow microspheres composed of glass, e.g. expanded glass, and as aluminosilicates such as pearlites and expanded clay. Lightweight fillers based on natural materials, for example mineral foam, pumice, foaming larva and/or expanded vermiculite, are likewise preferred. Organic fillers according to the invention are, for example, shredded plastic waste, for example plastic waste composed of polyvinyl chloride, polystyrene, polyethylene, polypropylene or melamine resins. Rubber particles and/or polystyrene spheres are preferred organic fillers according to the invention.

d) The present invention provides a ratio of the dispersant components (a) and the compound having superabsorbent properties (b) which in the combination (a)+(b) is 1:0.5-5.

Furthermore, the present invention encompasses a ratio of the components (a):(b):(c) which in the combination (a)+(b)+(c) is 1:0.5-5:2-6.

In a further aspect of the present invention, the combination of the components (a)+(c), i.e. the dispersant plus the hydrophobizing agent, has proportions of from 0.20 to 0.80% by weight, preferably from 0.25 to 0.45% by weight and particularly preferably from 0.25 to 0.35% by weight. The proportions mentioned are in each case based on the total composition of the dry mortar mixture.

As regards the combination of the components (b)+(c), i.e. the compound having superabsorbent properties with the hydrophobizing agent, the present invention provides preferred proportions of from 0.3 to 1.0% by weight, particularly preferably from 0.3 to 0.8% by weight and in particular from 0.35 to 0.6% by weight. These proportions, too, are in each case based on the total composition of the dry mortar mixture.

Finally, the present invention provides, in respect of the combination of the components (a)+(b)+(c), proportions which range from 0.4 to 1.0% by weight, preferably from 0.4 to 0.8% by weight and particularly preferably from 0.5 to 0.7% by weight. The proportions mentioned are again based on the total composition of the dry mortar mixture.

A feature essential to the invention is the dispersant (a). Suitable representatives are, according to the present invention, selected from the group consisting of compounds which contain at least one branched comb polymer having polyether side chains; however, naphthalenesulphonate-formaldehyde condensates ("BNS") and melaminesulphonate-formaldehyde condensates ("MFS") are also possible.

Suitable branched comb polymers having polyether side chains have been described, for example, in WO 2006/133933 A2.

These copolymers comprise two monomer components, with the first monomer component being an olefinically unsaturated monocarboxylic acid comonomer or an ester or a salt thereof and/or an olefinically unsaturated sulphuric acid comonomer or a salt thereof and the second monomer component being a comonomer of the general formula (I)

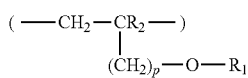

where $R_1$ is

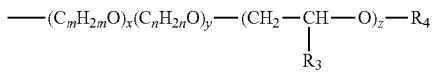

and $R_2$ is H or an aliphatic hydrocarbon radical having from 1 to 5 carbon atoms; $R_3$=unsubstituted or substituted aryl radical and preferably phenyl and $R_4$=H or an aliphatic hydrocarbon radical having from 1 to 20 carbon atoms, a cycloaliphatic hydrocarbon radical having from 5 to 8 carbon atoms, a substituted aryl radical having from 6 to 14 carbon atoms or a representative of the group

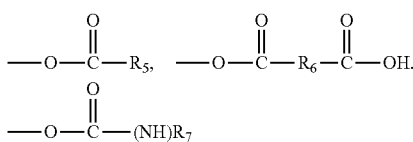

where $R_5$ and $R_7$ are each an alkyl, aryl, aralkyl or alkaryl radical and $R_6$ is an alkylidene, arylidene, aralkylidene or alkarylidene radical, and p=0, 1, 2, 3 or 4 m, n are each, independently of one another, 2, 3, 4 or 5, x and y are each, independently of one another, an integer ≤350 and z=0 to 200.

The content of WO 2006/133933 A2 is in terms of the copolymers described there a substantial part of the present disclosure.

In particular, the present invention encompasses a formulation in which the copolymer contains the comonomer component 1) in a proportion of from 30 to 99 mol % and the comonomer component 2) in a proportion of from 70 to 1 mol %. In this context, a copolymer which contains the comonomer component 1) in a proportion of from 40 to 90 mol % and the comonomer component 2) in a proportion of from 60 to 10 mol % has been found to be particularly advantageous.

The comonomer component 1) can preferably be an acrylic acid or a salt thereof and the comonomer component 2) can, in the case of p=0 or 1, be a variant containing a vinyl or allyl group and, as radical $R_1$, a polyether.

Furthermore, it is considered to be advantageous for the purposes of the present invention for the comonomer component 1) to come from the group consisting of acrylic acid, methacrylic acid, crotonic acid, isocrotonic acid, allylsulphonic acid, vinylsulphonic acid and suitable salts thereof and also alkyl or hydroxyalkyl esters thereof.

In addition, the copolymer can have additional structural units in copolymerized form, which is likewise allowed for by the present invention. In this case, the additional structural units can be styrenes, acrylamides and/or hydrophobic compounds, with ester structural units, polypropylene oxide and polypropylene oxide/polyethylene oxide units being particularly preferred. The copolymer a) should contain the above-mentioned additional structural units in proportions of up to 5 mol %, preferably from 0.05 to 3.0 mol % and in particular from 0.1 to 1.0 mol %.

In addition, it is advantageous for the formula (I) to represent a polyether containing allyl or vinyl groups.

s-Triazines or naphthalene-formaldehyde condensation products containing sulphonic acid groups are likewise adequately known from the prior art and are frequently used as plasticizers for cement-based systems, e.g. concrete. Sulphonated β-naphthalene-formaldehyde condensation products ("BNS"), also referred to as naphthalene-formaldehyde sulphonates ("NFS"), are able to disperse cement particles by means of electrostatic repulsion.

BNS or NFS are, in particular, suitable for giving cement particles a high dispersibility, as a result of which foaming is suppressed and water retention is increased. These effects make it possible to save hydraulic binders, for example cements, and improve the processability.

BNS representatives are usually obtained by condensation reactions of aromatic sulphonic acids such as naphthalenesulphonic acids with formaldehyde under atmospheric pressure at temperatures up to 100° C. The preparation of BNS compounds is well known and is described, for example, in EP 0 214 412 A1 and DE-C 2 007 603.

BNS condensation products are usually added to the dry mortar mixture in amounts of from 0.01 to 6.0% by weight, based on the binder component.

Sulphonated melamine-formaldehyde condensation products ("MFS") are likewise best known as plasticizers in compositions containing hydraulic binders, for example dry mortar mixtures.

In this context, melamine is a representative of the s-triazines. MFS resins are able to give building chemical compositions good flowability, with amounts in the range from 0.3 to 1.2% by weight, based on the binder component, being considered to be preferred.

In the context of MFS compounds, reference is made to DE 196 09 614 A1, DE 44 11 791 A1, EP 0 059 353 A1 and DE 195 38 821 A1 as prior art.

A further suitable representative of dispersant components (a) according to the present invention is a polycondensation product containing (I) at least one structural unit having an aromatic or heteroaromatic and a polyether side chain and (II) at least one phosphated structural unit having an aromatic or heteroaromatic and (III) at least one structural unit having an aromatic or heteroaromatic, where the structural unit (II) and the structural unit (III) differ exclusively in that the OP(OH)$_2$ group of the structural unit (II) is replaced by H in structural unit (III) and structural unit (III) is different from structural unit (I).

All the representatives of dispersants mentioned can be present either individually or in suitable mixtures in the dry mortar mixture proposed according to the invention.

e) As indicated above, the powdery copolymers which are known as SAPs and can be swelled by means of water or aqueous salt solutions are crosslinked, high molecular weight, either anionic or cationic polyelectrolytes which can be obtained by free-radical polymerization of suitable, ethylenically unsaturated vinyl compounds and subsequent measures for drying the copolymers. In the industry, they are usually referred to simply as superabsorbents. On contact with water or aqueous systems, swelling and absorption of water occur to form a hydrogel; here, a multiple of the weight of the powdery copolymer can be absorbed. For the purposes of the present invention, hydrogels are water-containing gels based on hydrophilic but crosslinked water-insoluble polymers which are present as three-dimensional networks. The hydrogel formed from the powdery, superabsorbent copolymer by absorption of water should have a very low content of water-soluble material so as not to affect the rheological properties of the building material mixtures adversely. According to the present invention, it is advantageous to use superabsorbents which have a high water absorption capacity even at high salt concentrations, in particular high calcium ion concentrations as are usually present in cement-containing aqueous systems.

As has likewise been mentioned above, the powdery copolymers (superabsorbents) according to the invention are preferably present either as anionic or cationic polyelectrolytes and essentially not as polyampholytes. For the purposes of the present invention, polyampholytes are polyelectrolytes which bear both cationic and anionic charges on the polymer chain. Greatest preference is thus given to copolymers which are purely anionic or purely cationic in nature. However, up to 10%, preferably less than 5%, of the total charge of a polyelectrolyte can be replaced by opposite charges. This applies both in the case of predominantly anionic copolymers having a relatively small cationic content and conversely to predominantly cationic copolymers having a relatively small anionic content.

Firstly, the anionic superabsorbent copolymers will be described:

Anionic structural units present are structural units containing sulphonic acid groups and having the general formula (II):

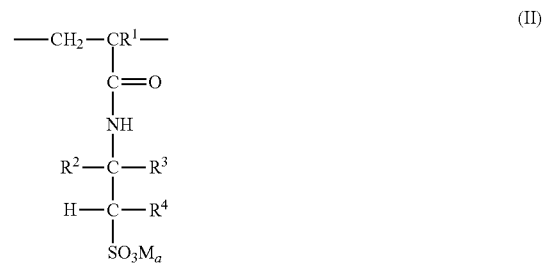

where
the radicals
$R^1$ are identical or different and are each hydrogen and/or a methyl radical,
$R^2$, $R^3$, $R^4$
are identical or different and are each, independently of one another, hydrogen, an aliphatic, branched or unbranched hydrocarbon radical having from 1 to 6 carbon atoms or an aromatic hydrocarbon radical having from 6 to 14 carbon atoms,
M are identical or different and are each hydrogen, a monovalent or divalent metal cation and/or an ammonium ion,
the indices
a are identical or different and are each ½ and/or 1.

Monomers containing sulphonic acid groups are preferred over monomers containing carboxylic acid groups since they form more stable hydrogels which can take up more water in aqueous salt solutions, particularly in the presence of calcium ions. In particular, superabsorbents containing sulphonic acid groups are superior to the superabsorbents containing mainly carboxylic acid groups, e.g. those based on crosslinked high molecular weight polyacrylic acid, in respect of this property. The structural unit containing sulphonic acid groups and corresponding to the general formula (II) is preferably derived from the copolymerization of one or more of the monomer species 2-acrylamido-2-methylpropanesulphonic acid, 2-methacrylamido-2-methylpropanesulphonic acid, 2-acrylamidobutanesulphonic acid and/or 2-acrylamido-2,4,4-trimethylpentanesulphonic acid or the salts of the acids mentioned. Particular preference is given to 2-acrylamido-2-methylpropanesulphonic acid and salt compounds derived therefrom. The cations of the salt compounds of the acids can in each case be present as monovalent or divalent metal cations, preferably sodium, potassium, calcium or magnesium ions, or as ammonium ions derived from ammonia, primary, secondary or tertiary $C_1$-$C_{20}$-alkylamines, $C_1$-$C_{20}$-alkanolamines, $C_5$-$C_8$-cycloalkylamines and $C_6$-$C_{14}$-arylamines. The alkyl radicals can in each case be branched or unbranched. Examples of such amines are methylamine, dimethylamine, trimethylamine, ethanolamine, diethanolamine, triethanolamine, cyclohexylamine, dicyclohexylamine, phenylamine and diphenylamine. Preferred cations are alkali metal ions and/or ammonium ions, with particular preference being given to the sodium ion. In the anionic superabsorbent copolymers, the structural units containing sulphonic add groups are present in a proportion of from 10 to 70 mmol %, preferably from 15 to 60 mol % and very particularly preferably from 20 to 50 mol %.

Furthermore, the anionic superabsorbent copolymers contain structural units containing (meth)acrylamido groups corresponding to the general formula (III):

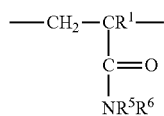

(III)

where
R[1] is as defined above,
R[5] and R[6]
are identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having 6 to 14 carbon atoms.

The structural units containing (meth)acrylamido groups are analogously also present in the cationic superabsorbent copolymers. The following description applies both to the anionic superabsorbent copolymers and the cationic superabsorbent copolymers. For example, the structural units are derived from the copolymerization of one or more of the monomer species acrylamide, methacrylamide, N-methyl (meth)acrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide. Preference is given to acrylamide, N,N-dimethylacrylamide and methacrylamide, with particular preference being given to acrylamide. In the anionic and cationic superabsorbent copolymers, the structural units containing (meth)acrylamido groups are present in proportions of from 30 to 90 mol %, preferably from 40 to 85 mol % and very particularly preferably from 50 to 80 mol %.

The structural units of the anionic superabsorbent copolymer which are derived from preferably water-soluble monomer compounds which have more than one free-radically polymerizable, ethylenically unsaturated vinyl group will in the further description be referred to as crosslinker monomers. They are also present in an analogous way in the cationic superabsorbent copolymers. The following description of the crosslinker monomers applies both to the anionic superabsorbent copolymers and the cationic superabsorbent copolymers.

The structural unit corresponding to the crosslinker monomers is preferably derived from the polymerization of one or more of the following monomer species: multiply (meth) acryl-functional monomers such as 1,4-butanediol di(meth)acrylate, 1,3-butylene glycol diacrylate, 1,3-butylene glycol dimethacrylate, diethylene glycol diacrylate, diethylene glycol dimethacrylate, ethylene glycol dimethacrylate, ethoxylated bisphenol A diacrylate, ethoxylated bisphenol A dimethacrylate, ethylene glycol dimethacrylate, 1,6-hexanediol di(meth)acrylate, neopentyl glydol dimethacrylate, polyethylene glycol di(meth)acrylate, triethylene glycol di(meth)acrylate, tripropylene glycol diacrylate, tetraethylene glycol di(meth)acrylate, dipentaerythritol pentaacrylate, pentaerythritol tetraacrylate, pentaerythritol triacrylate, trimethylolpropane tri(meth)acrylate, cyclopentadiene diacrylate, tris(2-hydroxyethyl)isocyanurate triacrylate and/or tris (2-hydroxy)isocyanurate trimethacrylate; monomers having more than one vinyl ester or allyl ester group with corresponding carboxylic acids, for example divinyl esters of polycarboxylic acids, diallyl esters of polycarboxylic acids, triallyl terephthalate, diallyl maleate, diallyl fumarate, trivinyl trimellitate, divinyl adipate and/or diallyl succinate; monomers having more than one (meth)acrylamido group, e.g. N,N'-methylenebisacrylamide and/or N,N'-methylenebismethacrylamide, and monomers having more than one maleimide group, e.g. hexamethylenebismaleimide; monomers having more than one vinyl ether group, e.g. ethylene glycol divinyl ether, triethylene glycol divinyl ether, pentaerythritol triallyl ether and/or cyclohexanediol divinyl ether. It is also possible to use allylamine or allylammonium compounds having more than one allyl group, e.g. triallylamine and/or tetraallylammonium salts. Among the group of monomers having more than one vinylaromatic group, mention may be made of divinylbenzene.

When selecting the appropriate monomers having more than one ethylenically unsaturated vinyl group, it is preferably ensured that these have good hydrolysis resistance in aqueous systems, in particular at the high pH values to be expected in cement-containing systems. When the building material mixtures are made up, mechanical stresses occur as shear forces, which particularly in the case of the high molecular weight crosslinked polymer systems can lead to rupture of bonds. For this reason, the corresponding methacryl-functional crosslinker monomers are preferred over the acryl-functional crosslinker monomer; the (meth)acrylamido-functional monomers and the allylamino or allyl ether-functional monomers are particularly preferred. Examples of particularly preferred crosslinker monomers are N,N'-methylenebisacrylamide, N,N'-methylenebismethacrylamide, triallyl isocyanurate, triallylamine and/or tetraallylammonium salts and also pentaerythritol triallyl ethers, very particularly preferred crosslinker monomers are N,N'-methylenebisacrylamide, N,N'-methylenebismethacrylamide, triallyl isocyanurate and/or triallylamine and also pentaerythritol triallyl ether. One or more of the crosslinker monomers can in each case be present in the copolymers. In the anionic and cationic superabsorbent copolymers, the crosslinker monomers are present in amounts of from 0.03 to 1 mol %, preferably from 0.05 to 0.7 mol %. Here, the amount of the crosslinker monomers should be at least so high that very water-insoluble copolymers or copolymers having a low proportion of soluble or extractable material are obtained. A person skilled in the art will be able to determine the amount of crosslinker monomers in a simple manner by carrying out routine tests. Crosslinking occurs during the course of the copolymerization reaction, but after-crosslinking as described for superabsorbents in "F. Buchholz, A. Graham, Modern Superabsorber Technology, John Wiley & Sons Inc., 1989, 55-67" can also be carried out after the copolymerization reaction.

Apart from the abovementioned three types of structural units of the anionic copolymers, it is also possible for from 1 to 30 mol % of further, preferably hydrophilic structural units to be present. These are preferably derived from uncharged or anionic, ethylenically unsaturated monomers. In the case of cationic monomers, the abovementioned restrictions in respect of the proportions in the anionic copolymer apply, i.e. up to 10%, preferably less than 5%, of the anionic charges can be replaced by cationic charges. Possible uncharged monomers are, for example, acrylonitrile, methacrylonitrile, vinylpyridine, vinyl acetate and/or hydroxyl-containing (meth)acrylic esters such as hydroxyethylacrylic acid, hydroxypropylacrylic acid and/or hydroxypropylmethacrylic acid.

The optional structural units are preferably derived from monomers selected from the group consisting of ethylenically unsaturated carboxylic acids or dicarboxylic acids or anhydrides thereof, e.g. methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, 2'-methylisocrotonic acid, cinnamic acid, maleic acid and maleic anhydride, p-chlorocinnamic acid, itaconic acid, citraconic acid, mesacronic acid, glutaconic acid, aconitic acid, fumaric acid and/or tricarboxyethylene. The further structural units are particularly preferably derived from acrylic acids and salts thereof and/or ethylenically unsaturated sulphonic acid monomers and in each case corresponding salts thereof, e.g. vinylsulphonic acid, allylsulfonic acid, styrenesulphonic acid, sulphoethyl acrylate, sulphoethyl methacrylate, sulphopropyl acrylate, sulphopropyl methacrylate and/or 2-hydroxy-3-methacryloxypropylsulphonic acid.

The cationic superabsorbent copolymers will be described below. In the cationic copolymers, the structural unit having a quaternary nitrogen atom and corresponding to the general formula (IV) is preferably derived from the polymerization of one or more monomer species selected from the group consisting of [2-(acryloyloxy)ethyl]-trimethylammonium salts, [2-(methacryloyloxy)ethyl]trimethylammonium salts, [3-(acryloylamino)propyl]trimethylammonium salts and/or [3-(methacryloylamino)-propyl]trimethylammonium salts:

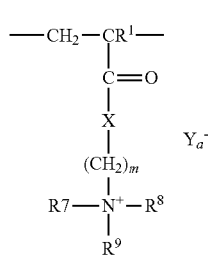

where
$R^1$ is as defined above,
$R^7$, $R^8$, $R^9$, $R^{10}$
are identical or different and are each, independently of one another, hydrogen, a branched or unbranched aliphatic hydrocarbon radical having from 1 to 20 carbon atoms, a cycloaliphatic hydrocarbon radical having from 5 to 8 carbon atoms or an aryl radical having from 6 to 14 carbon atoms,
the indices m are identical or different and are each an integer from 1 to 6,
the radicals X are identical or different and are each oxygen and/or $N-R^{10}$,
the anions $Y^-_a$ are identical or different and are each a halide, $C_1$-$C_4$-alkylsulphate, $C_1$-$C_4$-alkylsulphonate and/or sulphate, the indices a are identical or different and are each ½ and/or 1.

The salts mentioned are preferably present as halides or methosulphates. Particular preference is given to [3-(acryloylamino)propyl]trimethylammonium salts and/or [3-(methacryloylamino)propyl]trimethylammonium salts. Very particular preference is given to [3-(acryloylamino)propyl]trimethylammonium chloride (DIMAPA-Quat) and/or [3-(methacryloylamino)propyl]trimethylammonium chloride (MAPTAC). In the cationic superabsorbent copolymers, the structural unit of the general formula III which has a quaternized nitrogen atom is present in a proportion of from 10 to 70 mol %, preferably from 15 to 60 mol % and particularly preferably from 20 to 50 mol %.

Like the anionic superabsorbent copolymers, the cationic superabsorbent copolymers also contain the same structural units containing (meth)acrylamido groups, as per the general formula (III). The structural units of the general formula (III) have already been described in detail for the anionic copolymers; this description is hereby incorporated by reference at the present point.

The structural units which are derived from preferably water-soluble monomer compounds and have more than one free-radically polymerizable, ethylenically unsaturated vinyl group (crosslinker monomers) are also present both in the cationic superabsorbent copolymers and the anionic superabsorbent copolymers. This structural unit has likewise been described in detail above for the anionic superabsorbent copolymers. This description is likewise hereby incorporated by reference at the present point.

Apart from the abovementioned three types of structural units of the cationic copolymers, from 1 to 20 mol % of further, preferably hydrophilic structural units can optionally be present. These are preferably derived from uncharged or cationic, ethylenically unsaturated monomers. In the case of anionic monomers, the abovementioned restrictions in respect of the proportions in the cationic copolymer apply, i.e. up to 10%, preferably less than 5%, of the cationic charges can be replaced by anionic charges. Possible uncharged monomers are, for example, acrylonitrile, methacrylonitrile, vinylpyridine, vinyl acetate and/or hydroxyl-containing (meth)acrylic esters such as hydroxyethylacrylic acid, hydroxypropylacrylic acid and/or hydroxypropylmethacrylic acid. Suitable cationic monomers are, for example, N,N'-dimethyldiallylammonium chloride and N,N'-diethyldiallylammonium chloride.

In a particularly preferred embodiment of the anionic superabsorbent copolymer, structural units which are derived from 20 to 50 mol % of 2-acrylamido-2-methylpropanesulphonic acid (corresponding to structural unit I), from 50 to 80 mol % of acrylamide (corresponding to structural unit II) are present and the crosslinker monomer is triallylamine and/or N,N'-methylenebisacrylamide and/or pentaerythritol triallyl ether. In a likewise particularly preferred embodiment of the cationic superabsorbent copolymer, structural units which are derived from 20 to 50 mol % of [3-(acryloylamino)propyl] trimethylammonium chloride (corresponding to formula (IV)), from 50 to 80 mol % of acrylamide (corresponding to formula (III)) are present and the crosslinker monomer is triallylamine and/or N,N'-methylenebisacrylamide and/or pentaerythritol triallyl ether.

The preparation of the anionic or cationic superabsorbent copolymers according to the invention can be carried out in a manner known per se by linking of the monomers which form the respective structural units by free-radical polymerization (anionic copolymers: structural units of the general formulae (II), (III) and above-described crosslinker monomers, optionally further anionic or uncharged monomers; cationic copolymers: structural units of the general formulae (VI), (III) and above-described crosslinker monomers, optionally further cationic or uncharged monomers).

All monomers present as acid can be polymerized as free acids or in salt form. Furthermore, neutralization of the acids can be carried out by addition of appropriate bases after the copolymerization; partial neutralization before or after the polymerization is likewise possible. Neutralization of the monomers or the copolymers can be carried out using, for example, the bases sodium hydroxide, potassium hydroxide, calcium hydroxide, magnesium hydroxide and/or ammonia. Primary, secondary or tertiary $C_1$-$C_{20}$-alkylamines, in each case having branched or unbranched alkyl groups, $C_1$-$C_{20}$-alkanolamines, $C_5$-$C_8$-cycloalkylamines and/or $C_6$-$C_{14}$-arylamines are likewise suitable as bases. It is possible to use one base or a plurality of bases. Preference is given to neutralization by means of alkali metal hydroxides and/or ammonia, with particular preference being given to sodium hydroxide. The inorganic or organic bases should be selected so that they form relatively readily water-soluble salts with the respective acid.

The copolymerization of the monomers is preferably carried out by free-radical bulk, solution, gel, emulsion, dispersion or suspension polymerization. Since the products according to the invention are hydrophilic copolymers which can be swelled in water, polymerization in an aqueous phase, polymerization in inverse emulsion or polymerization in inverse suspension is preferred. In particularly preferred embodiments, the reaction is carried out as a gel polymerization or inverse suspension polymerization in organic solvents.

The copolymerization of the superabsorbent polymer can be carried out, in a particularly preferred embodiment, as an adiabatic polymerization and can be initiated either by means of a redox initiator system or by means of a photoinitiator. In addition, a combination of the two initiation variants is possible. The redox initiator system comprises at least two components, viz. an organic or inorganic oxidant and an organic or inorganic reducing agent. Use is frequently made of compounds having peroxide units, e.g. inorganic peroxides such as alkali metal persulphate and ammonium persulphate, alkali metal perphosphates and ammonium perphosphates, hydrogen peroxide and salts thereof (sodium peroxide, barium peroxide) or organic peroxides such as benzoyl peroxide, butyl hydroperoxide or peracids such as peracetic acid. However, it is also possible to use other oxidants, for example potassium permanganate, sodium and potassium chlorates, potassium dichromate, etc. As reducing agents, it is possible to use sulphur-containing compounds such as sulphites, thiosulphates, sulphinic acid, organic thiols (for example ethyl mercaptan, 2-hydroxyethanethiol, 2-mercaptoethylammonium chloride, thioglycol acid) and others. Ascorbic acid and low-valency metal salts [copper(I); manganese(II); iron(II)] are also possible. Phosphorus compounds, for example sodium hypophosphite, can also be used.

In the case of photopolymerization, this is initiated using UV light which brings about disintegration of a photoinitiator. As photoinitiator, it is possible to use, for example, benzoin and benzoin derivatives such as benzoin ethers, benzyl and derivatives thereof, e.g. benzyl ketals, acryldiazonium salts, azo initiators such as 2,2'-azobis(isobutyronitrile), 2,2'-azobis(2-amidinopropane) hydrochloride and/or acetophenone derivatives.

The proportion by weight of the oxidizing component and the reducing component in the case of the redox initiator systems is in each case preferably in the range from 0.00005 to 0.5% by weight, particularly preferably in each case from 0.001 to 0.1% by weight. In the case of photoinitiators, this range is preferably from 0.001 to 0.1% by weight, particularly preferably from 0.002 to 0.05% by weight. The percentages by weight indicated for the oxidizing and reducing components and photoinitiators are in each case based on the mass of the monomers used for the copolymerization. The choice of polymerization conditions, in particular the amount of initiator, is made with the objective of producing very long-chain polymers. However, owing to the insolubility of the crosslinked copolymers, the molecular weights are very difficult to measure.

The copolymerization is preferably carried out in aqueous solution, preferably in concentrated aqueous solution, discontinuously in a polymerization vessel (batch process) or continuously by the "endless belt" method described in U.S. Pat. No. 4,857,610. A further possibility is polymerization in a continuously or discontinuously operated kneading reactor.

The process is usually initiated at a temperature in the range from −20 to 20° C., preferably from −10 to 10° C., and carried out at atmospheric pressure without introduction of heat from the outside; a maximum final temperature depending on the monomer content of from 50 to 150° C. is obtained as a result of the heat of polymerization. After the copolymerization is complete, the polymer which is present as a gel is generally comminuted. The comminuted gel is dried in a convection drying oven at from 70 to 180° C., preferably from 80 to 150° C., when the polymerization is carried out on a laboratory scale. On an industrial scale, drying can also be carried out continuously in the same temperature ranges, for example on a belt dryer or in a fluidized-bed dryer.

In a further preferred embodiment, the copolymerization is carried out as an inverse suspension polymerization of the aqueous monomer phase in an organic solvent. Here, the monomer mixture which has been dissolved in water and optionally neutralized is preferably polymerized in the presence of an organic solvent in which the aqueous monomer phase is insoluble or sparingly soluble. The polymerization is preferably carried out in the presence of "water-in-oil" emulsifiers (W/O emulsifiers) and/or protective colloids based on low molecular weight or high molecular weight compounds which are used in proportions of from 0.05 to 5% by weight, preferably from 0.1 to 3% by weight, based on the monomers. The W/O emulsifiers and protective colloids are also referred to as stabilizers. It is possible to use customary compounds known as stabilizers in inverse suspension polymerization technology, e.g. hydroxypropylcellulose, ethylcellulose, methylcellulose, cellulose acetate butyrate mixed ethers, copolymers of ethylene and vinyl acetate, of styrene and butyl acrylate, polyoxyethylenesorbitan monooleate, laurate or stearate and block copolymers of propylene oxide and/or ethylene oxide.

Organic solvents used are, for example, linear aliphatic hydrocarbons such as n-pentane, n-hexane, n-heptane, branched aliphatic hydrocarbons (isoparaffins), cycloaliphatic hydrocarbons such as cyclohexane and decalin and also aromatic hydrocarbons such as benzene, toluene and xylene. Further suitable organic solvents are alcohols, ketones, carboxylic esters, nitro compounds, halogen-containing hydrocarbons, ethers and many other organic solvents. Preference is given to organic solvents which form azeotropic mixtures with water, particularly preferably those which have a very high proportion of water in the azeotrope.

The water-swellable copolymers are initially obtained in swelled form as finely divided aqueous droplets in the organic suspension medium and are preferably isolated as solid spherical particles in the organic suspension medium by removal of the water. Separating off the suspension medium and drying leaves a powdery solid. The inverse suspension polymerization is known to have the advantage that the particle size distribution of the powders can be controlled by varying the polymerization conditions and an additional process step (milling) for setting the particle size distribution can therefore usually be avoided.

Preference is given to anionic and cationic superabsorbent copolymers whose particle size distribution determined according to the standard edana 420.2-02 is such that more than 98% by weight passes a sieve having a mesh opening of 200 μm and particularly preferably more than 98% by weight passes a sieve having a mesh opening of 100 μm. Very particular preference is given to more than 98% by weight passing a sieve having a mesh opening of 63 μm.

The particle size distribution can be set by milling the products obtained after drying of the copolymers. Large particles would cause visible inhomogeneous regions in which only the hydrogel formed by swelling of the superabsorbent is present in the aqueous building material mixtures. There could also be an increased risk of demixing of the hydrogels and further important properties such as strength development could be adversely affected. The probability of after-thickening, which is undesirable from the user's point of view, is also higher in the case of large particles. High shear forces as occur, for example, on making up the building material mixtures by means of a drilling machine customary for mixing tile adhesives, etc., or similar mixers can also have a greater effect in the case of large particle sizes and lead to comminution of the hydrogels and thus an increase in the proportion of soluble material which is responsible for the thickening effect, or the proportion of extractables (after-thickening effect). Setting of the correct consistency of the building material mixture is then very difficult for the user. One test method to determine the shear stability is to make up, for example, a tile adhesive according to the invention with water and then stir for a further 30 seconds by means of a drilling machine. The slump (determined as described in Claim 1) should preferably change by not more than 0.5 cm afterwards.

Advantageous superabsorbent copolymers quickly develop their full water absorption capacity in the aqueous systems. A slow water absorption would likewise lead to undesirable after-thickening due to slow withdrawal of water from the building material mixture. To check whether after-thickening is present, water is added to the building material mixture, e.g. a tile adhesive, and the mixture is stirred. After the addition of water, the slump should preferably change by less than 0.5 cm during the time between the third and tenth minute.

A preferred property of both the anionic and cationic superabsorbent copolymers is their insolubility in aqueous systems and also the property of having only a low proportion of extractables. The proportion of extractables is the proportion of material which can diffuse from the superabsorbent polymer into a surrounding aqueous medium. The method of determining the proportion of extractables is as follows:

The determination of the absorption capacity of the superabsorbents according to the invention is carried out according to the standard edana 440.2-02 developed for the hygiene industry with a modification of the method, i.e. replacement of the 0.9 percent sodium chloride solution specified there as test liquid by a one percent calcium formate solution. This method, also known as the "teabag" test is carried out by sealing a defined amount (about 200 mg) of superabsorbent polymer in a teabag and dipping this for 30 minutes into a one percent strength calcium formate solution. The teabag is subsequently allowed to drip for five minutes and it is then weighed. A teabag without superabsorbent polymer is concomitantly tested as blank. The absorption capacity is calculated using the following formula:

Absorption capacity=(final weight−blank−initial weight)/initial weight(g/g)

Determination of the Proportion of Extractables in the Superabsorbent Copolymers The proportion of extractables is determined by extraction of the superabsorbent copolymer in 0.9 percent sodium chloride solution with subsequent determination of the total organic carbon (TOC). 1.0 g of the superabsorbent polymer is for this purpose allowed to stand in one liter of 0.9 percent sodium chloride solution for sixteen hours and is subsequently filtered off. To determine the TOC content of the filtrate, the proportion of extractables is calculated via the known carbon content of the superabsorbent polymer.

The proportion of extractables is in each case based on the mass of the superabsorbent and is preferably less than 10% by weight, particularly preferably less than 9% by weight and very particularly preferably less than 8% by weight.

The absorption capacity of the anionic and cationic superabsorbents in aqueous salt solutions and in particular also in solutions containing calcium ions is preferably as high as possible, not least for economic reasons. In the case of products which have been prepared by the process of gel polymerization, the absorption capacity is preferably greater than 10 g/g, particularly preferably greater than 15 g/g and very particularly preferably greater than 20 g/g. In the case of products which have been prepared by the process of inverse suspension polymerization, the absorption capacity determined by the same method is preferably greater than 5 g/g, particularly preferably greater than 10 g/g and in particular greater than 15 g/g. Both the anionic superabsorbent copolymers and the cationic superabsorbent copolymers are present in the dry mixture in an amount of from 0.02 to 2.0% by weight, preferably from 0.1 to 1.5% by weight, particularly preferably from 0.2 to 1.0% by weight. The anionic superabsorbent copolymers are preferred over the cationic superabsorbent copolymers.

It is generally the case that the compound having superabsorbent properties, i.e. the component (b), according to the present invention is at least one compound containing a proportion of the monomer component 2-acrylamido-2-methyl-propanesulphonic acid ("AMPS"). The proportion of this monomer component should be up to 50 mol % and is preferably in the range from 5 to 30 mol %.

In a preferred variant of the dry mortar mixture claimed, the component (b) is a superabsorbent polymer (SAP) having anionic and/or cationic properties.

As regards the component (b), it may be particularly emphasized that the representatives mentioned in each case have no associatively thickening properties.

f) Apart from the dry mortar mixture itself, the present invention also claims the use thereof. Here, the emphasis is on, in particular, tile adhesives, repair mortars, jointing mortars and renders. However, the use of the dry mortar mixture as a constituent of renders is also possible. A further possible use is as adhesive and/or reinforcing mortar for external thermal insulation composite systems (ETICS).

The building material mixture of the invention is preferably used as tile adhesive in accordance with DIN EN 12004, as mineral waterproof coating, joint filler in accordance with EN 13888, repair mortar in accordance with EN 1504, skin coat, render in accordance with EN 998-1 and adhesive and reinforcing mortar for external thermal insulation composite systems (ETICS) in accordance with EN 13499 and EN 13500. For the purposes of the present invention, repair mortars are, for example, mortars for the repair or replacement of damaged concrete. Skin coats serve, for example, for final working of a substrate in order to give flat surfaces (walls or ceilings). External thermal insulation composite systems are insulating systems which are usually employed on the building site using factory-produced thermal insulation materials. They are fastened using an adhesive mortar; if mechanical strengthening (reinforcement) is to be applied, the term reinforcing mortar is employed.

Overall, suitable fields of application are ones in which the dry mortar mixture has to have a certain sag resistance in the made-up but not yet hardened state.

A further aspect of the present invention is that in the case of applications in connection with repair mortars, jointing mortars, renders or thermal insulation composite systems, the dry mortar mixture contains a combination of the components (a)+(b)+(c). When used as the adhesive, the dry mortar mixture should contain a combination of the components (a)+(b). The hydrophobizing agent is in this case not necessary, but can of course be added if required.

In principle, the dry mortar mixtures claimed and described are particularly suitable for exterior use.

The production of the dry mortar mixtures claimed is not subject to any restriction:

Ready-to-use building material mixtures are obtained by mixing the dry mortar mixtures of the invention with water. The user can set the water requirement as desired on the basis of the inventive combination of the dispersant component a) with the superabsorbent copolymer b). Otherwise, the water requirement of the building material systems is determined by the type and amount of the dry mixture component and the respective requirements of the use.

The following examples illustrate the advantages of the present invention.

1st example sag resistant tile adhesive:

Sag resistant tile adhesive (37% by weight of portland cement)
Composition:

| Mixture 1.1 (comparison) | % by weight |
|---|---|
| OPC CEM I 52.5 R | 37.000 |
| Silica sand 0.1-0.4 mm | 47.000 |
| Metakaolin | 3.000 |
| Ground limestone | 3.000 |
| Slag sand | 4.000 |
| Calcium formate | 1.000 |
| Cellulose fibres | 0.700 |
| Redispersible polymer powder | 3.000 |
| Cellulose ether | 0.400 |
| Thickener (organic) | 1) 0.12 |
| or | 2) 0.08 |
| Thickener (inorganic) | 0.57 |
| Water | 21.000 |

| Mixture 1.2 (comparison) | % by weight |
|---|---|
| OPC CEM I 52.5 R | 37.000 |
| Silica sand 0.1-0.4 mm | 48.000 |
| Metakaolin | 3.000 |
| Ground limestone | 3.000 |
| Slag sand | 4.000 |
| Calcium formate | 1.000 |
| Redispersible polymer powder | 3.000 |
| Cellulose ether | 0.400 |
| Thickener (organic) | 1) 0.10 |
| or | 2) 0.05 |
| Thickener (inorganic) | Balance |
| Superabsorbent polymer (component b) | 0.43 |
| Water | 21.000 |

| Mixture 1.3 (invention) | % by weight |
|---|---|
| OPC CEM I 52.5 R | 37.000 |
| Silica sand 0.1-0.4 mm | 48.000 |
| Metakaolin | 3.000 |
| Ground limestone | 3.000 |
| Slag sand | 4.000 |
| Calcium formate | 1.000 |
| Redispersible polymer powder | 3.000 |
| Cellulose ether | 0.400 |
| Thickener (organic) | 1) 0.10 |
| or | 2) 0.05 |
| Thickener (inorganic) | Balance |
| Plasticizer (dispersant a) | 0.09 |
| Superabsorbent polymer (component b) | 0.43 |
| Water | 21.000 |

| | |
|---|---|
| OPC CEM I 52.5 R | Mike CEM I 52.5 R (HeidelbergCement, Ennigerloh) |
| Cellulose fibres | Arbocel FD 40 (Rettenmaier, Rosenberg) |
| Dispersion powder | Vinnapas LL 7200 (Wacker Chemie AG, Munich) |
| Cellulose ether | Culminal 65.000 PF (Hercules Aqualon) |
| Dispersant | Melflux 2651 F (BASF Construction Polymers GmbH, Trostberg) |
| Thickener (inorganic) | Bentonite |
| Thickener (organic) | 1) Starvis T50F |
| | 2) Starvis SE35F |

The component b) was prepared as follows:

Anionic Superabsorbent Copolymer:

160 g of water were placed in a 2 l three-necked flask provided with stirrer and thermometer and 352.50 g (0.74 mol, 28 mol %) of 2-acrylamido-2-methylpropanesulphonic acid sodium salt (50% by weight solution in water), 286.40 g (2.0 mol, 72 mol %) of acrylamide (50% by weight solution in water) and 0.3 g (0.0021 mol, 0.08 mol %) of methylenebisacrylamide were subsequently added in succession. After setting the pH to 7 using 20% sodium hydroxide solution and flushing with nitrogen for 30 minutes, the mixture was cooled to about 5° C. The solution was transferred to a plastic container having the dimensions (b·t·h) 15 cm·10 cm·20 cm and 16 g of one percent 2,2'-azobis(2-amidinopropane)dihydrochloride solution, 20 g of one percent sodium peroxodisulphate solution, 0.7 g of one percent Rongalit C solution, 16.2 g of 0.1 percent tert-butyl hydroperoxide solution and 2.5 g of 0.1 percent Fe(II) sulphate heptahydrate solution were subsequently added in succession. The copolymerization was initiated by irradiation with UV light (two Philips tubes; Cleo Performance 40 W). After about two hours, the gel which has become hard is taken from the plastic container and cut by means of scissors into cubes having an edge length of about 5 cm. Before the gel cubes are comminuted by means of a conventional meter, they are painted with the release agent Sitren 595 (polydimethylsiloxane emulsion; from Goldschmidt). The release agent is a polydimethylsiloxane emulsion which has been diluted in a ratio of one to twenty with water.

The gel copolymer granules obtained were uniformly distributed on a drying mesh and dried to concentrate in a convection drying oven at from about 120 to 140° C. This gave about 375 g of white, hard granules which were converted into a powdery state by means of a centrifugal mill. The average particle size of the polymer powder was from 30 to 50 μm and the proportion of particles which did not pass a sieve having a mesh opening of 63 μm was less than 2% by weight.

Test Results:

| | Mixture | | |
|---|---|---|---|
| | 1.1 | 1.2 | 1.3 |
| Consistency [slippage in mm of a 1000 g tile] | below 1.00 | below 1.00 | below 1.00 |
| Open time [min] | 25 | 20 | 25 |
| Brookfield viscosity [mPa * s * $10^3$] | 1580 | 1350 | 1370 |

|  | Mixture | | |
|---|---|---|---|
|  | 1.1 | 1.2 | 1.3 |
| Adhesion pull-off strength, 7 d dry on concrete [N/mm$^2$] | 0.93 | 1.38 | 1.64 |
| Adhesion pull-off strength, 28 d dry on concrete [N/mm$^2$] | 0.94 | 1.55 | 1.51 |
| Adhesion pull-off strength, 7 d dry 21 d wet on concrete [N/mm$^2$] | 1.62 | 1.50 | 1.74 |
| Adhesion pull-off strength, 14 d 20° C. 14 d 70° C. hot [N/mm$^2$] | 0.82 | 1.21 | 1.46 |

Summary:

The adhesion pull-off strength on concrete substrates could be significantly improved by means of the inventive mixture 1.3 of superabsorbent and plasticizer. In addition, a better absorption behaviour, a better and lengthened correctability of the tile and longer open times could be observed. The viscosity was reduced, as a result of which more convenient processing properties are achieved and the sticking to the tool can be reduced.

2nd Example Adhesive and Reinforcing Mortar:

Adhesive and reinforcing mortar (20% by weight of portland cement)

Composition:

| Mixture 2.1 (comparison) | % |
|---|---|
| OPC CEM I 42.5 R | 20.000 |
| Silica sand 0.1-0.4 mm | 40.000 |
| Silica sand 0.3-1.0 mm | 29.135 |
| Ground limestone | 8.000 |
| Cellulose fibres | 0.300 |
| Acrylic fibres 6 mm/3 mm | 0.015 |
| Redispersible polymer powder | 2.000 |
| Modified cellulose ether | 0.150 |
| Sodium oleate | 0.200 |
| Calcium stearate | 0.200 |
| Water | 25.000 |

| Mixture 2.2 (comparison) | % |
|---|---|
| OPC CEM I 42.5 R | 20.000 |
| Silica sand 0.1-0.4 mm | 40.000 |
| Silica sand 0.3-1.0 mm | 30.035 |
| Ground limestone | 8.000 |
| Cellulose fibres | 0.300 |
| Acrylic fibres 6 mm/3 mm | 0.015 |
| Redispersible polymer powder | 1.000 |
| Modified cellulose ether | 0.130 |
| Superabsorbent polymer (component b) | 0.170 |
| Sodium oleate | 0.150 |
| Calcium stearate | 0.150 |
| Water | 30.000 |

| Mixture 2.3 (invention) | % |
|---|---|
| OPC CEM I 42.5 R | 20.000 |
| Silica sand 0.1-0.4 mm | 40.000 |
| Silica sand 0.3-1.0 mm | 30.035 |
| Ground limestone | 8.000 |
| Cellulose fibres | 0.300 |
| Acrylic fibres 6 mm/3 mm | 0.015 |
| Redispersible polymer powder | 1.000 |
| Modified cellulose ether | 0.130 |
| Superabsorbent polymer (component b) | 0.170 |
| Dispersant a) | 0.05 |
| Sodium oleate | 0.150 |
| Calcium stearate | 0.150 |
| Water | 25.000 | b) Adhesive and reinforcing mortar (30% of portland cement)

Composition:

| Mixture 2.4 (comparison) | % |
|---|---|
| OPC CEM I 42.5 R | 30.000 |
| Silica sand 0.1-0.4 mm | 38.000 |
| Silica sand 0.3-1.0 mm | 28.335 |
| Cellulose fibres | 0.300 |
| Acrylic fibres 6 mm/3 mm | 0.015 |
| Redispersible polymer powder | 3.000 |
| Modified cellulose ether | 0.150 |
| Sodium oleate | 0.200 |
| Water | 25.000 |

| Mixture 2.5 (comparison) | % |
|---|---|
| OPC CEM I 42.5 R | 30.000 |
| Silica sand 0.1-0.4 mm | 38.000 |
| Silica sand 0.3-1.0 mm | 29.635 |
| Cellulose fibres | 0.300 |
| Acrylic fibres 6 mm/3 mm | 0.015 |
| Redispersible polymer powder | 1.500 |
| Modified cellulose ether | 0.130 |
| Superabsorbent polymer (component b) | 0.170 |
| Sodium oleate | 0.200 |
| Water | 31.000 |

| Mixture 2.6 (invention) | % |
|---|---|
| OPC CEM I 42.5 R | 30.000 |
| Silica sand 0.1-0.4 mm | 38.000 |
| Silica sand 0.3-1.0 mm | 29.635 |
| Cellulose fibres | 0.300 |
| Acrylic fibres 6 mm/3 mm | 0.015 |
| Redispersible polymer powder | 1.500 |
| Modified cellulose ether | 0.130 |
| Superabsorbent polymer (component b) | 0.170 |
| Dispersant a) | 0.050 |
| Sodium oleate | 0.200 |
| Water | 25.000 |

| | |
|---|---|
| OPC GEM I 42,5 R | Milke CEM I 42.5 R (HeidelbergCement, Ennigerloh) |
| Cellulose fibres | Arbocel FD 40 (Rettenmaier, Rosenberg) |
| Acrylic fibres | Panacea dry (Lambda Furtherance b.v., The Hague, NL) |
| Redispersible polymer powder | Vinnapas 7034 N (Wacker Chemie AG, Munich) |
| Modified cellulose ether | Tylose MH 15002 P6 (Shin-Etsu, Wiesbaden) |
| Sodium oleate | Sodium oleate (Baerlocher GmbH, Unterschleißheim) |
| Dispersant a) | Melflux 2651 F (BASF Construction Polymers GmbH, Trostberg) |
| Calcium stearate | Calcium stearate (Bearlocher GmbH, Unterschleißheim) |

Test Result:

|  | Mixture | | | | | |
| --- | --- | --- | --- | --- | --- | --- |
|  | 2.1 | 2.2 | 2.3 | 2.4 | 2.5 | 2.6 |
| Slump, 5 minutes [cm] | 16.5 | 16.5 | 16.4 | 16.9 | 16.9 | 16.8 |
| Adhesion pull-off strength, 28 d dry on EPS 035 [N/mm$^2$] | 0.10 | 0.08 | 0.13 | 0.16 | 0.11 | 0.15 |
| Adhesion pull-off strength, 28 d dry + 2 d wet + 2 h dry on EPS 035 [N/mm$^2$] | 0.10 | 0.05 | 0.10 | 0.17 | 0.13 | 0.17 |
| Adhesion pull-off strength, 28 d dry + 2 d wet + 7 d dry on EPS 035 [N/mm$^2$] | 0.13 | 0.07 | 0.15 | >0.27 | 0.17 | >0.27[1] |
| Adhesion pull-off strength, 28 d dry on concrete [N/mm$^2$] | 1.3 | 0.8 | 1.2 | 2.1 | 1.6 | 1.8 |
| Adhesion pull-off strength, 28 d dry + 2 d wet + 2 h dry on concrete [N/mm$^2$] | 0.5 | 0.4 | 0.6 | 1.4 | 1.0 | 1.4 |
| Adhesion pull-off strength, 28 d dry + 2 d wet + 7 d dry on concrete [N/mm$^2$] | 1.0 | 0.8 | 1.0 | 1.8 | 1.4 | 1.7 |
| Capillary water absorption [kg/m$^2$] | 1.3 | 2.6 | 1.2 | 1.2 | 1.8 | 0.4 |

[1]Full-area Styropor ® tear-out

Summary:

In the inventive mixtures 2.3 and 2.6 with the combination of superabsorbent and dispersant, the adhesion on hydrophobic substrates, e.g. EPS, could be kept constant or improved slightly even though the amount of redispersible polymer powder was halved. This means a cost advantage for the dry mortar producer. Secondly, it can be seen that the combination of dispersants and superabsorbents has reduced the tendency for water to be absorbed in the mortar matrix. This makes possible an increased durability under freeze-thaw stresses and also provides the opportunity of reducing the proportion of hydrophobizing agent.

The invention claimed is:

1. A dry mortar mixture based on at least one of a hydraulic or latently hydraulic binder, which in the made-up and fresh state has sag resistant properties, wherein the sag resistant properties are determined in accordance with DIN EN 1308, with a Hägermann slump of <18 cm, determined in accordance with DIN EN 1015-3, wherein it contains at least one representative of a dispersant (a) in an amount of from 0.01 to 5.0% by weight, based on the total composition of the dry mortar mixture, and a compound having superabsorbent properties (b), wherein the compound having superabsorbent properties (b) is a cross-linked superabsorbent polymer comprising at least one member selected from the group consisting of an anionic monomer and cationic monomer.

2. A dry mortar mixture according to claim 1, wherein it contains a hydrophobizing agent as component (c).

3. A dry mortar mixture according to claim 1, wherein the hydraulic binder is a cement.

4. A dry mortar mixture according to claim 3, wherein the cement is selected from the group consisting of a Portland cement, white cement, quicklime and aluminate cement.

5. A dry mortar mixture according to claim 4, wherein the Portland cement is selected from the group consisting of CEM I, CEM II, CEM III, CEM IV and CEM V.

6. A dry mortar mixture according to claim 3, wherein the cement is present in an amount of from 3 to 50% by weight, based on the total composition of the dry mortar mixture.

7. A dry mortar mixture according to claim 1, containing the latently hydraulic binder comprises at least one member selected from the group consisting of fly ash, blast furnace slag, metakaolin, microsilica, trass flour, aluminosilicate, tuff, phonolite, diatomaceous earth and oil shale.

8. A dry mortar mixture according to claim 1, containing the latently hydraulic binder in an amount of 5 to 50% by weight, based on the total composition of the dry mortar mixture.

9. A dry mortar mixture according to claim 1, containing aggregates having an average particle size up to 5 mm.

10. A dry mortar mixture according to claim 9, wherein said aggregates are present in an amount of from 5 to 85% by weight, based on the total composition of the dry mortar mixture.

11. A dry mortar mixture according to claim 9, wherein the aggregates comprise at least one member selected from the group consisting of siliceous sands, siliceous flours and a carbonate.

12. A dry mortar mixture according to claim 9, wherein the carbonate is selected from the group consisting of ground limestone, crushed limestone sands, chalk, dolomite and magnesite.

13. A dry mortar mixture according to claim 1, wherein the hydrophobizing agent is present in an amount of from 0.1 to 0.6% by weight based on the total composition of the dry mortar mixture.

14. A dry mortar mixture according to claim 1, wherein a ratio (a):(b) in a combination of (a)+(b) is 1:0.5-5.

15. A dry mortar mixture according to claim 2, wherein the ratio (a):(b):(c) in the combination (a)+(b)+(c) is 1:0.5-5:2-6.

16. A dry mortar mixture according to claim 2, wherein a total of dispersant (a)+the hydrophobizing agent (c) is present in an amount of from 0.20 to 0.8% by weight based on the total composition of the dry mortar mixture.

17. A dry mortar mixture according to claim 2, wherein a combination of the compound having superabsorbent properties (b)+the hydrophobizing agent (c) is present in an amount of from 0.3 to 1.0% by weight based on the total composition of the dry mortar mixture.

18. A dry mortar mixture according to claim 1, wherein a combination of dispersant (a)+the compound having superabsorbent properties (b)+the hydrophobizing agent (c) is present in an amount of from 0.4 to 1.0% by weight based on the total composition of the dry mortar mixture.

19. A dry mortar mixture according to claim 1, wherein dispersant (a) comprises at least one member selected from the group consisting of a branched comb polymer having polyether side chains, naphthalenesulphonate-formaldehyde condensate and melaminesulphonate-formaldehyde condensate.

20. A dry mortar mixture according to claim 1, dispersant (a) is a polycondensation product containing
(I) at least one structural unit having an aromatic or heteroaromatic and a polyether side chain and
(II) at least one phosphated structural unit having an aromatic or heteroaromatic and
(III) at least one structural unit having an aromatic or heteroaromatic,
where the structural unit (II) and the structural unit (III) differ exclusively in that the OP(OH)2 group of the structural unit (II) is replaced by H in structural unit (III) and structural unit (III) is different from structural unit (I).

21. A dry mortar mixture according to claim 1, wherein the compound having superabsorbent properties (b) comprises a monomer component 2-acrylamido-2-methylpropanesulphonic acid from 0 to 50 mo %.

22. A dry mortar mixture according to claim 21, wherein the compound having superabsorbent properties (b) is present in an amount of from 5 to 30 mol %.

23. A dry mortar mixture according to claim 1, wherein the anionic monomer is selected from the group consisting of ethylenically unsaturated, water-soluble carboxylic acids, derivatives of ethylenically unsaturated, water-soluble carboxylic acids and an ethylenically unsaturated sulphonic acid monomers.

24. A dry mortar mixture according to claim 23, wherein the ethylenically unsaturated carboxylic acid or the carboxylic anhydride monomer is selected from the group consisting of acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chlorocinnamic acid, β-stearic acid, itaconic acid, citraconic acid, mesacronic acid, glutaconic acid, aconitic acid, maleic acid, fumaric acid, tricarboxyethylene or maleic anhydride and in that the ethylenically unsaturated sulphonic acid monomer is an aliphatic or aromatic vinylsulphonic acid or an acrylic or methacrylic sulphonic acid, vinylsulphonic acid, allylsulphonic acid, vinyltoluenesulphonic acid and styrenesulphonic acid.

25. A dry mortar mixture according to claim 1, wherein the cationic monomer is a monomer having a permanent cationic charge comprising a [3-(acryloylamino)propyl]trimethylammonium salt and/or [3-(methacryloylamino)propyl]-trimethylammonium salt.

26. A dry mortar mixture according to claim 1, wherein hydrophobicizing agent (c) comprises a fatty acid derivative selected from the group consisting of a C1-14-alkyl ester of lauric acid, a C1-14-alkylaryl ester of lauric acid, C1-14-alkyl ester of oleic acid, a C1-14-alkylaryl ester of oleic acid, a monoglycol ester of lauric acid, a diglycol ester of lauric acid, a monoglycol ester of oleic acid, a diglycol ester oleic acid, a monoester of glycerol with lauric acid, a monoester of glycerol with oleic acid, a diester of glycerol with lauric acid, a diester of glycerol with oleic acid, a trimester of glycerol with lauric acid, a trimester of glycerol with oleic acid and a metal salt of a fatty acid.

27. A composition for use as a tile adhesive, repair mortar, jointing mortar, render or reinforcing mortar for external thermal insulation composite comprising the dry mortar mixture of claim 2.

28. A composition for use as a tile adhesive, repair mortar, jointing mortar, render or reinforcing mortar for external thermal insulation composite comprising the dry mortar mixture of claim 2.

29. A tile adhesive composition comprising the dry mortar mixture of claim 1.

30. The composition of claim 28 for use as an application to an exterior surface.

* * * * *